April 14, 1964 F. W. ALBRECHT 3,129,411

MATRIX SWITCHING ARRANGEMENT

Filed July 11, 1960 5 Sheets-Sheet 1

INVENTOR

Friedrich Wilhelm Albrecht

By George M Spencer

Attorney

April 14, 1964 F. W. ALBRECHT 3,129,411

MATRIX SWITCHING ARRANGEMENT

Filed July 11, 1960 5 Sheets-Sheet 2

INVENTOR

Friedrich Wilhelm Albrecht

By George M. Spencer

Attorney

INVENTOR
Friedrich Wilhelm Albrecht
By George M. Spencer
Attorney

April 14, 1964 F. W. ALBRECHT 3,129,411

MATRIX SWITCHING ARRANGEMENT

Filed July 11, 1960 5 Sheets-Sheet 4

INVENTOR

Friedrich Wilhelm Albrecht

By George H. Spencer

Attorney

MATRIX SWITCHING ARRANGEMENT

Filed July 11, 1960 5 Sheets-Sheet 5

INVENTOR

Friedrich Wilhelm Albrecht

By George H. Spencer

Attorney

United States Patent Office 3,129,411
Patented Apr. 14, 1964

3,129,411

MATRIX SWITCHING ARRANGEMENT

Friedrich Wilhelm Albrecht, Wilhelmshaven, Germany, assignor to Olympia Werke A.G., Wilhelmshaven, Germany Filed July 11, 1960, Ser. No. 41,949
Claims priority, application Germany July 15, 1959
9 Claims. (Cl. 340—174)

The present invention relates to binary computers. More particularly, the invention relates to a switching arrangement for the storage matrix of the binary computer.

Electronic computers have been known utilizing the storage matrix, particularly, types using magnetic core storage means, for storing the bits of information to be subsequently used for calculation, bookkeeping, accounting and other purposes. The digital computer utilizes the binary system for the words made up by the bits of information.

The storage matrix is used as an intermediate member between the computer and the read-out device. The read-out device may be a printing mechanism which operates by means of a punched tape input. The read-out device, generally, can print the information which is fed to it only if the information has a certain type of combination of bits of information. For example, the word may be fed in series-series information, or the arrangement may be in bits-series word-parallel information.

It is an object of the present invention to provide a storage matrix which can store the bits of information, regardless of the particular form in which the information is made available from the computer. The information can then be read out of the storage matrix in any desired manner in order to be properly compatible with the particular read-out device used.

It is another object of the present invention to provide a new and improved storage matrix for use with binary computers.

It is a further object of the invention to provide a new and improved storage matrix wherein the information stored may be read out in any desired manner compatible with the particular read-out device utilized.

It is an additional object of the present invention to provide a storage matrix which uses bistable shift registers, said registers being operated in either shifting direction.

With the above objects in view, the present invention mainly consists of a storage matrix in which bits of information are stored along at least two different geometrical directions. This matrix includes first shift register means connected to portions of the storage matrix along a first geometrical direction. A second shift register means is also provided and connected to the same portions of the storage matrix, but along a different geometrical direction. The shift register means are bidirectional shift registers capable of reversing the direction of movement of information therethrough, independently of the direction of movement of information through the other shift register.

In a preferred embodiment of the present invention, the first shift register means is divided into register groups. The register groups, in turn, are divided into a plurality of register group stages, the number of stages in each register group being equal to the number of bits of information in each word to be stored in the matrix. A plurality of writing conductors are connected at one of their respective ends to portions of the matrix arranged along a first geometrical direction, the other ends of these conductors being respectively connected to one of the register group stages. The conductors, in turn, are arranged in conductor groups which are equal to the number of bits of information in each word to be stored in the matrix, the number of conductors in each conductor group being equal to the number of such register groups, so that each register group has a stage connected to each of the conductor groups. Finally, a plurality of reading conductors are provided, each of which reading conductors being respectively connected at one of its ends to one of the portions of the matrix and at the other of its ends to the same register stage as the writing conductor connected to the same portion.

In a further preferred embodiment, the apparatus utilizes a second shift register means, which means are connected to the same portions of the matrix along a second geometrical dimension, the outputs from the first and last stages of the first shift register means being connected to the input of the second shift register means for providing the shift pulse which initiates operation of the second shift register means.

Additional objects and advantages of the present invention will become apparent upon consideration of the following description when taken in conjunction with the accompanying drawings, in which.

Figure 1:
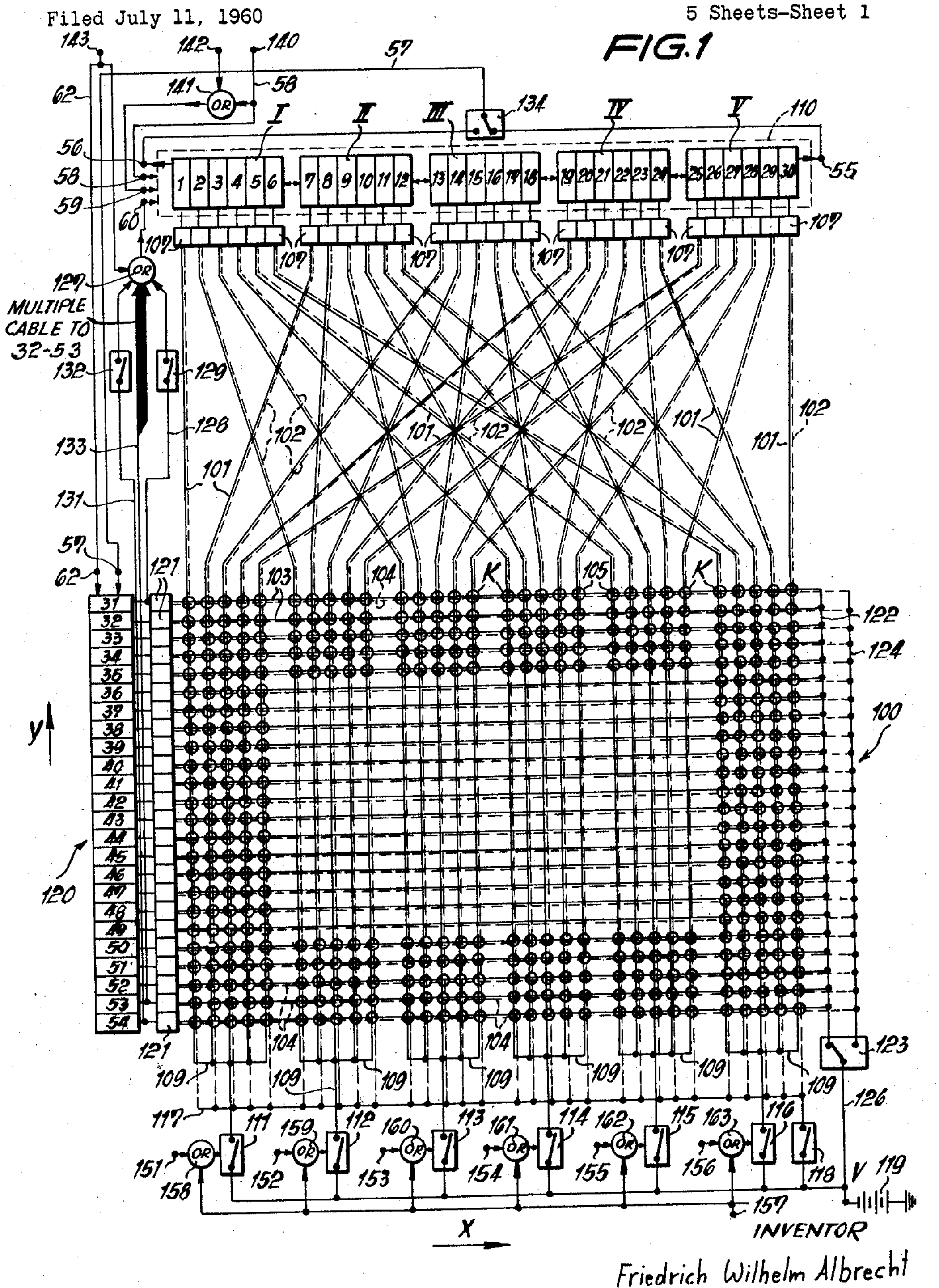
FIGURE 1 is an electrical schematic diagram of the storage matrix and the switching apparatus therefor, incorporating the principal of the present invention.

FIGURES 3*a* and 3*b*, 4*a* and 4*b* and 5*a* and 5*b* are respectively examples of different types of bits of information which may be stored in the matrix of FIGURE 1, utilizing the switching means shown therein.

Figure 6:
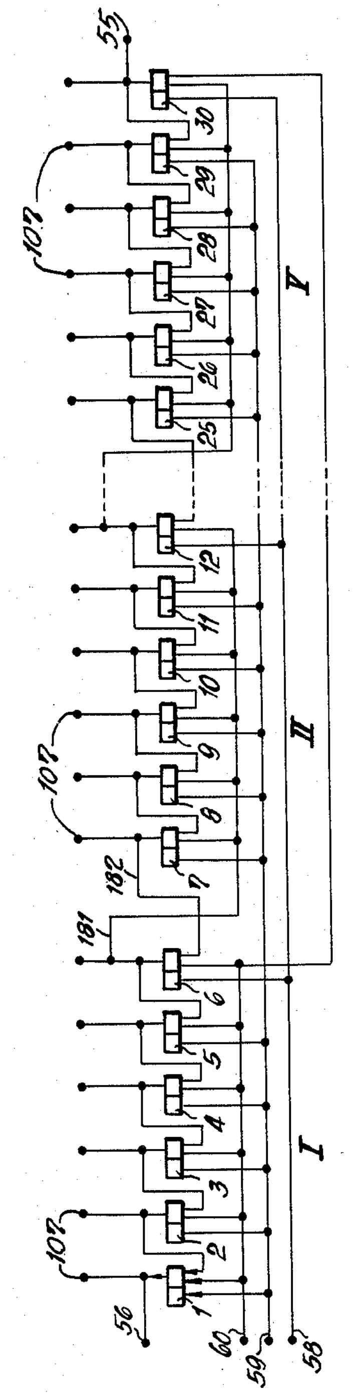

FIGURE 6 is an electrical schematic diagram showing the various shift register stages of a portion of the schematic diagram of FIGURE 1.

Figure 7:
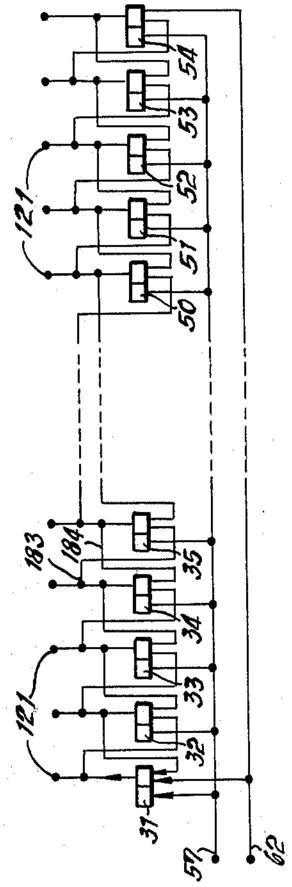

FIGURE 7 is an electrical schematic diagram showing the remaining shift register stages of the arrangement of FIGURE 1.

Figure 8:
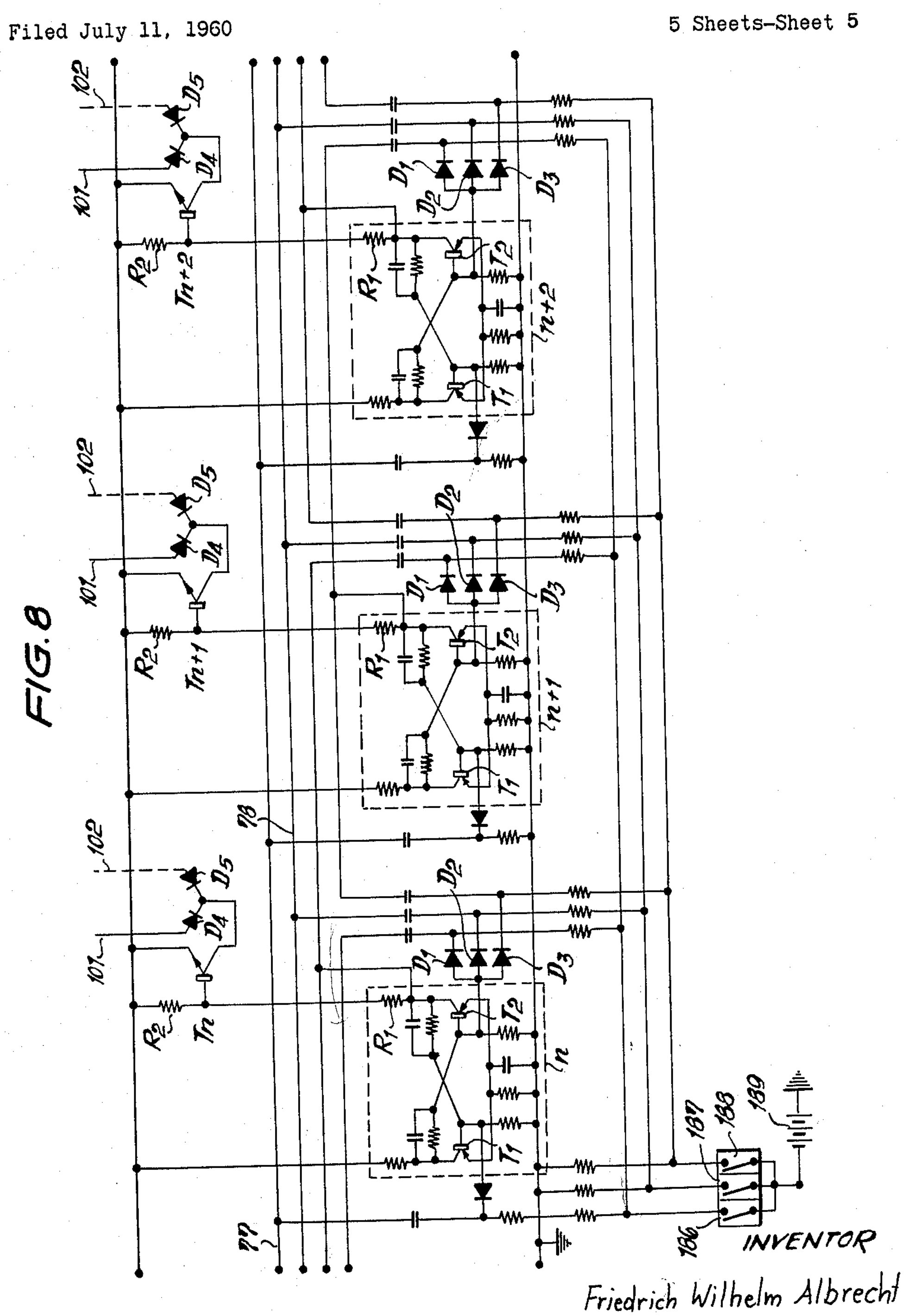

FIGURE 8 is an electrical schematic diagram showing an embodiment of a switching arrangement for controlling the various shift register stages of the apparatus shown in FIGURE 1.

Referring in detail to the drawings and, more particularly, to FIGURE 1 thereof, it can be seen that the storage matrix 100 is provided with a plurality of magnetic cores. These cores are shown only in schematic form and are, generally, toroidal cores about which several windings are placed. These cores are conventional in nature and, accordingly, are not specifically described in this application. The core has several windings thereabout, one for writing purposes, one for reading purposes, and one for sensing purposes.

With such a known arrangement, the magnetic cores may be moved from one stable condition, such as the binary "1" position to the binary "0" position, and vice versa. These changes are carried out by a coincidence of current flowing through two different windings wrapped around the same core.

In the arrangement shown in FIGURE 1, each of the cores has wrapped therearound two separate writing conductors and two separate reading conductors. Furthermore, the cores are arranged in rows and columns, the columns running vertically in the "*y*" direction and the rows running horizontally in the "*x*" direction.

In FIGURE 1, the conductors connected to the cores arranged in each column and serving the function of column writing conductors are designated by the numeral 101 and are shown as solid lines. The column reading conductors also connected to each of the cores in the column are shown in dashed lines and are designated by the numeral 102. One column writing conductor and one column reading conductor are provided for each column of the storage matrix.

Similarly, one row writing conductor and one row reading conductor are provided for each of the cores of the storage matrix arranged in a row. The row writing conductor is shown as a solid line and designated with the numeral 103, while the row reading conductor is shown as a dashed line and is indicated by the numeral 104.

As is known in the art, when a current flows through the writing conductor of the core, it places the core in the binary "1" position so that the core stores the bit of information "1." Similarly, a current flowing through the reading conductor of the core places the conductor in its binary "0" condition, so that the core stores that bit of information. The reading and writing conductors are wound in opposite directions about the same core so that current flowing through the windings in the same direction will provide opposite influences on the magnetization or demagnetization of the core.

Figure 2:
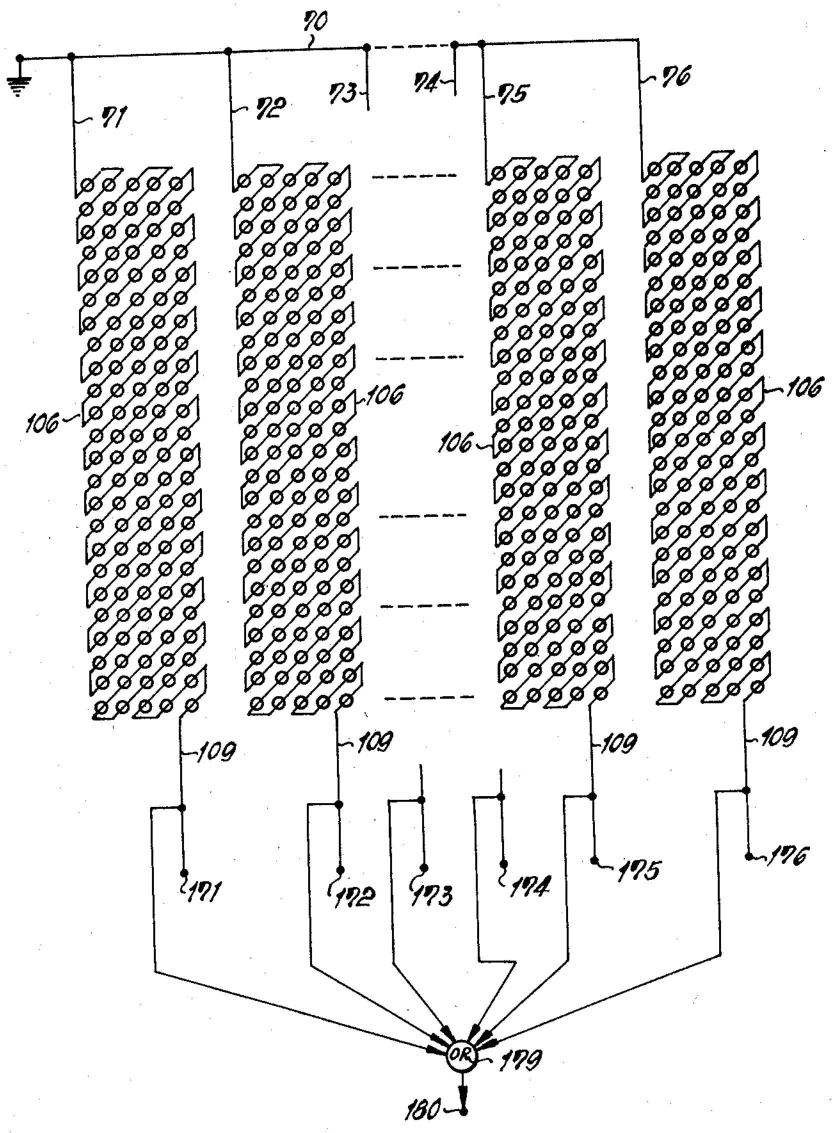
FIGURE 2 is an electrical schematic diagram showing the means whereby the bits of information stored in the matrix of FIGURE 1 are sensed by the read-out device.

Information stored in the core is read out from the core by means of sensing conductors which are also wound about the cores 105 in the storage matrix 100. Since the indication of the sensing conductors in FIGURE 1 would unnecessarily complicate the drawing, the sensing conductors are best seen in FIGURE 2, indicated by the numeral 106. The operation of these sensing, reading, and writing conductors will be described later on in the application.

In FIGURE 1, each of the column reading conductors and column writing conductors is connected to current drivers 107. It can be seen that the current drivers 107 which are shown in schematic box form each has connected thereto a column writing conductor 101 and a column reading conductor 102. The circuitry of the current drivers 107 will be described with respect to FIGURE 8 later in the application.

Each of the other ends of the current drivers 107 is connected, respectively, to a different stage of a shift register 110. The shift register 110, also shown in schematic form, comprises thirty shift register stages numbered consecutively 1–30. The stages of the shift register 110 are shown divided into five groups of six stages each. The groups are designated by the Roman numerals I–V.

The register stages 1–30 are made out of bistable switches, such as flip-flop arrangements, and will be described below with respect to FIGURES 6 and 7. The shift register 110 is used for transmitting bits of information to the current drivers and from there, in turn, to the cores of the storage matrix. The bits of information may be transmitted through the storage register in any desired direction from 1 to 30 or from 30 to 1.

In the descriptive examples to be given in this application for describing the operation of the switching arrangement of the storage matrix, six-bit words have been chosen. These are words made up of six different bits of information. It is for this reason that the shift register stages 1–30 are divided into groups of six. In this manner, each register group has as many stages as the number of bits of information in each word to be stored.

In FIGURE 1, the column reading conductors 101 and the column writing conductors 102 are connected from the current drivers 107 to the cores 105 in the storage matrix 100 in a preselected manner. The cores 105 are shown divided in such a manner that five columns of cores form a column group, these groups being connected at their lower ends to a conductor 109. Each column group conductor 109 is connected, respectively, to a different switch 111–116.

The reading conductors wound about the same cores of the various column groups are all connected at their lower ends to a conductor 117 and from there to a common switch 118 which may be constituted by a transistor. All of the switches 111–116 and 118 are connected to the same terminal of a voltage source 119.

It can be seen that the pairs of reading and writing conductors are connected from the drivers 107 to the cores of the matrix 100 so that in Group I of the register stages 1–6, for example, each current driver 107 is connected to a different column group. Stage 1 is connected to the first column of the first column group of cores. Stage 2 has its current driver connected to the first column of the second column group of cores, and so on, until stage 6 has its current driver 107 connected to the first column of the last group of column cores. Similarly, each of the other stages of the other four groups has its respective driver connected to the corresponding position of the column group cores. Therefore, the five columns of cores represented by the first five columns are connected to the first stage of each of the five groups of stages. The second stage of each of the groups is connected to the second group of cores, and so on, until the sixth stage of each of the groups is connected to the sixth group of columns of cores.

Thus, the register stages are divided into register stage groups, each of which groups has a number of stages corresponding to the number of bits of information in one word, namely, six. On the other hand, the conductors from the various stages are divided into groups wherein the number of groups corresponds to the number of bits of information per word. Accordingly, there are five register stage groups having six stages per group, and there are six conductor groups having five conductors per group.

The row shift register stages will now be described. The row shift register is shown at the left end of the storage matrix and is designated by the numeral 120. This shift register has twenty-four stages designated by the numerals 31–54. Each of the stages has respectively connected thereto a current driver 121.

Each stage of the row shift register 120 is constructed in the conventional bistable manner known as the flip-flop, so that the bits of information may be shifted from stage to stage by the proper application of pulse signals as will later be described. The information may be transmitted through the stages 31–54 or in reverse from 54–31, as will also be described. As has already been disclosed, each of the cores 105 of the storage matrix 100 has wound thereabout row writing conductors 103 and row reading conductors 104. It can be seen that each current driver 121 of each stage of the row shift register 120 has connected thereto a pair of conductors 103 and 104 arranged along a row of the matrix. Therefore, the current driver 121 of the stage 31 has connected thereto at the left end of the conductors 103 and 104 a reading and writing conductor for the top row of the matrix. The connections from the current drivers to the cores are the same extending down to the last row wherein the current driver 121 for the register stage 54 is shown connected to the row writing conductor 103 and row reading conductor 104 of the lowest row.

All of the row writing conductors are connected at their respective right ends to a common conductor 122 which is connected to one pole of a switch 123. The row reading conductors are connected at their respective right ends to a common conductor 124 which is connected to a separate pole of the single-throw double pole switch 123. The movable contact of the switch 123 is connected by means of conductor 126 to the voltage source 119.

The outputs of the register stages 32–53 are connected together with their respective current drivers 121 to the input of an "OR" gate 127. The output of the "OR" gate 127 is connected to the input conductor 60 of the column shift register 110.

The register stage 31 of the row shift register 120 is also connected to the input of the "OR" gate 127 by means of conductor 128 and switch 129. Similarly, the output of the shift register stage 54 is connected to the input of the "OR" gate 127 by means of conductor 131 and switch 132.

The connections of the register stages 32–53 to the "OR" gate 127 are shown merely as a single conductor 133 which is broadened at its upper end to indicate that there actually are a plurality of conductors, each of which is individually connected to a respective shift register stage. This is done in order to avoid unnecessarily complicating the drawing with many additional conductors.

The column shift register 110 is shown provided with two separate outputs 55 and 56, both of which are connected to a switch 134. The two different outputs represent the different directional movements of the bits of information to the bidirectional shift register. The switch 134 may be an electronic switch of known construction. By means of this switch 134, the outputs 55 and 56 may be connected to the input 57 to the first stage 31 of the row shift register 120 for the shift pulse applications to the row shift register.

The shift pulses for the shift register 110 are applied to the input terminal 140 and from there they are applied directly to the input 58 of the shift register 110. The input terminal 140 is also connected by means of an "OR" gate 141 to the input 59 of the shift register 110.

A second input terminal 142 is also connected to the "OR" gate 141 and from there to the input 59 of the shift register for the application of clearing pulses.

A third input terminal 143 is indicated adjacent the terminal 142 and is provided for the register input pulses for registering the particular bits of information to the switching apparatus. The terminal 143 is connected by means of the "OR" gate 127 to the input 60 of the column shift register 110 and directly by means of the input conductor 62 to the row shift register 120.

At the lower end of the storage matrix there are shown seven additional input terminals 151 to 157. Each of the input terminals 151–156 is respectively connected to an "OR" gate 158–163. The input terminal 157 is also connected to the "OR" gates 158–163. The terminals 151–156 are used for controlling the respective switches 111–116, as will be explained hereinafter, by means of their respective "OR" gates. Furthermore, the input terminal 157 can be used for simultaneously operating all of the switches 111–116.

Referring now to FIGURE 2, the sensing conductors of the storage matrix are shown, on which sensing conductors pulses are produced when the stored information is read out from the storage matrix. Only the first two and last two columns of the matrix 100 are shown in FIGURE 2, since they are all wired in the same manner. The other end of each conductor 109 going through the cores of each column is connected to a common ground conductor 70 by means of respective conductors 71, 72, 73, 74, 75 and 76. An application of a read-out pulse to any of the cores will produce an output pulse on the output conductor 109 for the column in which that core is arranged. Each output conductor 109 is individually connected to its own respective output terminal 171–176 and is also connected to a common output terminal 180 by means of the "OR" gate 179. The individual output terminals are used for parallel read-out, and the common upper terminal 180 is used for a series read-out.

In this manner, it is possible to read out the information from the various cores in either a series or a parallel manner, depending upon the operation of the switching apparatus of FIGURE 1 and the desired operation in order to be compatible with the read-out device doing the actual printing.

In order to understand more clearly the operation of the apparatus, several illustrative examples will be given. However, the various principles of operation of the different members in FIGURES 1 and 2 will first be briefly described. The operation of a shift register having bistable shift register stages is known. A register input to the input of the first stage of the register places this in the binary "1" position. A second input to all of the shift register stages by means of a shift pulse will move the binary in condition from shift register stage 1 to the next shift register stage 2. With the return of the stage 1 to its original position, it emits a pulse which places the second register stage in the binary "1" position. The next shift pulse will reset the second register stage to its binary "0" position and will apply an output pulse therefrom to the register stage 3. This places the register stage 3 in the binary "1" position and this operation can continue through all of the register stages until the stage 30.

The electronic shift register 110 is arranged so that its register stages may be shifted individually or together by groups. Furthermore, the direction of transmission of information is reversible through the register 110. Similarly, the direction of transmission of information through the shift register 120 is reversible from the stages 31–54. However, these operate one stage after the other, rather than by groups, as can be carried out in the register 110.

*Example 1*

In Example No. 1, the bits of information to be stored and read out will be stored in word-serial-bit-parallel writing and stored in this manner and will be read out in word-serial-bit-serial and in reversed direction from the direction of storing.

Figures 3A, 3B:
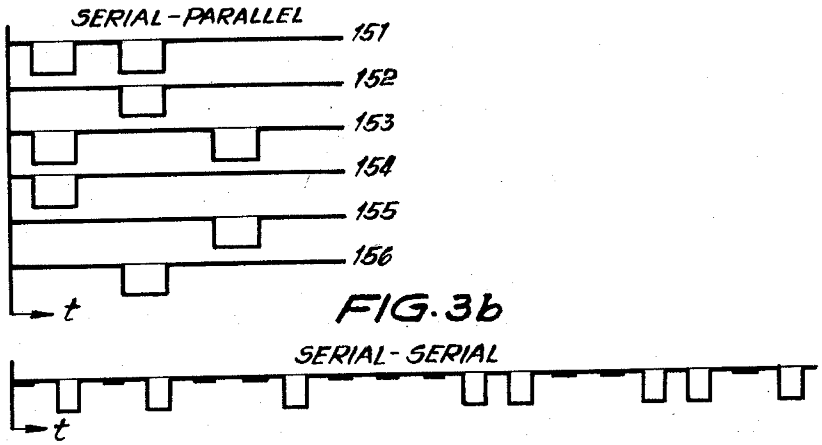

FIGURE 3*a* shows the information to be stored, and FIGURE 3*b* shows the information as it is read out from the matrix 100. In FIGURE 3*a*, three six-bit words are shown. These words are 101100; 110001; and 001010. FIGURE 3*b* illustrates the desired result, the above words appearing in serial form in reversed series as follows: 010100; 100011; and 001101.

In operation, the wave forms shown in FIGURE 3*a* are applied to the respective terminals 151–156 in the time sequence shown to operate the switches 111–116. If, for example, the first word 101100 is obtained from a punch-tape reader, it is applied simultaneously to the six input information terminals so that, for this word, the switches 111, 113, and 114 will be closed, while the switches 112, 115, and 116 will remain open.

Therefore, it is seen that for the word-serial-bit-parallel information the switches 111–116 are arranged in either open or closed position, depending upon the information contained in the bit applied to its respective channel. On the other hand, for word-serial-bit-serial presentation, these pulses will be applied to the common input terminal 157, and all of the switches 111–116 will be either open or closed at the same time. The positions of the electronic switch 118 and the electronic switch 123 are controlled by a command storage signal in a well-known manner and are not indicated in this drawing in order to avoid unnecessarily complicating the drawing. In FIGURE 1, the illustrated positions of the switches 118 and 123 correspond to the desired command signals.

*Word-serial-bit-parallel writing.*—For this type of writing, the shift pulses are applied to the terminal 140 and from there to all of the stages of the shift register 110 corresponding to the flow of individual bits of information. As will be explained below, the registers 100 and 120 can be made to operate in forward direction, stages 31–54 of the register 120, and in group operation for the register 110 in the forward direction, Group I to Group V. Corresponding to these conditions of the shift registers, the electronic switches 129 and 132 are operated so that switch 129 is closed and switch 132 is open.

The register input terminal 143 is applied simultaneously with the first bit of information that is applied to the input terminals 151–156. This register input is applied by means of the input conductor 62 to the first register stage 31 of the row shift register 120, thereby controlling its respective current driver 121 so as to place all of the cores along the top row of the matrix 100 in set-up condition. The register input pulse applied to the terminal 143 also is applied to the shift register 110 through the "OR" gate 127 and switches all of the stages 1–6 of the first group of stages of the register 110 to the binary "1" position and thereby controls the respective drivers 107 so that the cores to which these drivers are connected will be in a position to have information stored therin, i.e., the drivers are connected to the cores by means of the various reading and writing conductors 101 and 102, respectively. Since these are connected to the first column of each of the six groups of columns of cores, the first six-bit word that is applied to the input terminals 151–156 will be stored only along this first column. As only the top row has been set up by the register stage 31, only the cores also arranged along this row will store information. Therefore, for example, the bit of information applied to the input terminal 151 will be stored in the core of the first row and first column in the first group. The bit of information applied to terminal 152 will be stored in the core in the first column and first row of the second group of cores, and so on, until the bit of information in the sixth input channel 156 will be stored in the core in the first column and the first row of the last of the six groups of cores. Since, in the word-serial-bit-parallel type of application, the bits of information are simultaneously applied to the six input channels, it is seen that the six cores will store their information at the same time.

The next shift pulse applied to the input channel 140 will reset the first six stages of Group I of the register 110 to the binary "0" position and the output pulse produced thereby will place the next six stages 7–12 of Group II into the binary "1" position. This will control the current drivers 107 for the stages 7–12 and, in turn, set up the cores in the second column of each of the column groups. The bits of information next appearing on the input channels 151–156 will, therefore, be stored in the core appearing along the first row of cores and in the second column of each of the six column groups of cores.

The information is continued to be stored in this manner until the last six stages 25–30 of register Group V of register 110 stores the information in the last column of cores of the column groups. When the stages 25–30 are reset to their binary "0" position, the output pulse appearing on the output 55 is applied through the switch 134 to the input 57 so as to apply a shifting pulse to the register 120. This shifting pulse switches the register 31 from its binary "1" position to its binary "0" position. The resulting output pulse from this stage 31 switches the stage 32 to its binary "1" position.

The same output pulse from the stage 31 is applied by means of the closed switch 129 and the "OR" gate 127 to the input 60 of the first Group I of the register stages 1–6 putting these register stages in their respective binary "1" position. In this way, the register stages of the register 110 are set up to transmit information therethrough.

Since stage 32 has now been placed in the binary "1" position, it will control its respective current drvier so that all of the cores in the second row of the storage matrix will be in a position to have information stored therein. It is, therefore, apparent that the next six-bit word applied to the six input channels 151–156 will be stored in the first column of the second row of cores of each of the column groups. Similarly, as the stages of the shift register 110 are shifted from group to group, the cores appearing in the second row of the storage matrix will each have the proper word information stored therein.

This storage continues until all of the stages or register 110 have been operated from their binary "0" position to their binary "1" position, and reset to the binary "0" position. The accompanying output pulse on conductor 55 will then shift the register stage 32 from its binary "1" position to its binary "0" position. The output pulse from this stage will put the stage 33 from its binary "0" to its binary "1" position and will reset stages 1–6 of Group I of register 110.

This operation will continue until all of the words to be stored in the storage matrix are completed. The open switch 132 which is connected to stage 54 will prevent the recycling of the stages after the last core in the last row of the last column has that information stored therein. Since the storage matrix of the illustrated embodiment has 30 stages in the register 110 and 24 stages in the register 120, it is apparent that $30 \times 24 = 720$ bits can be stored, or 120 six-bit words.

*Read-out, word-serial-bit-serial.*—A particular advantage of the switching arrangement embodying the principles of the present invention will now be demonstrated. In order to read out the information previously stored, it is not essential that the information be read out in the same manner as stored. Furthermore, it is not necessary to individually operate each register stage of each of the shift registers in order to obtain the information stored in each core. Also, if desired, the read-out can begin with the last bit of information stored, rather than with the first.

Let us assume that in the previous storing arrangement 54 bits of information had been stored. This means that the row of cores corresponding to the register stage 41 and the fourth column of the column groups would have been the last cores energized. This fourth column of cores corresponds to Group IV of the shift register 110. Since, at the end of the storing of all of the information, the output of the shift pulse blocks the stages in their particular position, the matrix will retain this information until the read-out performance is desired.

By means which will be described below, the register stages 1–30 of the register 110 are prevented from operating simultaneously with a clearing pulse being applied to the input terminal 142. This pulse is applied to the input 59 for reversing the direction in which the information is transmitted through the first five register stages of each of the five register groups of the register 110. Since the cores to be read out start with the fourth column in the storage matrix, the register stages of the fourth group, namely, stages 19–23 will be placed in the binary "0" position, while the stage 24 will be placed in the binary "1" position.

The next command to the storage matrix is the command "read" which automatically changes the direction of transmission of information to the registers 110 and 120. This is done by closing the switch 118 in the column reading conductors 109 so that the voltage source 119 is applied to the switch 118; by operating the switch 123 so that the row reading conductors 124 are connected to the voltage source 119; and by operating the electronic switch 134 so that the shift pulse input conductor 57 coming from the register stage 120 is connected with the output 56 from the register 110.

After these switching operations are carried out, the core corresponding to the intersection of the row operated by the register stage 41 and the column operated by the register stage 24 will have a reading current flowing therethrough. The information content of the last bit of information to be stored in the storage matrix will now appear as the first pulse or "NO" pulse on the output 180 of FIGURE 2.

By means which are not illustrated, the shift pulses are then applied to the input terminal 140 from the read-out device. The first shift pulse applied to the terminal 140 resets the register stage 24 to its binary "0" position, and the output from this stage moves the stage 23 into the binary "1" position.

The core corresponding to the row controlled by stage 41 and the column controlled by stage 23 will have a reading current flowing therein so that the information stored therein will be produced on the common output 180 as the second pulse or "NO" pulse. The next shift pulse will reset the register stage 23 to the binary "0" position, while setting the register stage 22 to its binary "1" position.

In this manner, the register stages of the register 110 will continue operating in the reverse direction until the register stage 1 is reset to its binary "0" position. The resulting output pulse therefrom will be applied on its output 56 through the switch 134 to the input 57 of the register stage 120. This will operate as a shift pulse for the register stage.

Since the register stage 41 was in the binary "1" position, it will be reset to the binary "0" position and will set the stage 40 into the binary "1" position. At this time, the tenth row of the storage matrix will have reading current flowing therethrough. This corresponds to the register stage 40.

The output pulse from the register stage 41 is also applied by means of the "OR" gate 127 to the input 60 of the register stage 110 which will set register stage 30 of register 110 into the binary "1" position. This will permit the register stage 30 to have reading current flowing therethrough, so that the core corresponding to the intersection between the tenth row and the last column of the last group of cores will then have the information stored therein read out. The stage 30 is then returned to its binary "0" position by the next shift pulse applied to the terminal 140, thereby providing an output pulse for setting the stage 29 into its binary "1" position.

This operation will continue until the register stage 31 of the register 120 is returned to its binary "0" position. A further switching or operation of the stages of the register 120 is avoided by the open switch 129.

It has thus been demonstrated in the above manner how it is possible to obtain a series-series read-out in the reverse sense, as shown in FIGURE 3*b*, from a series-parallel writing, as shown in FIGURE 3*a*. It should be noted that the series-parallel writing was done in the conventional left-to-right manner, while the read-out was accomplished by the desired right-to-left manner.

*Example 2*

Figure 4A:
Figure 4B:
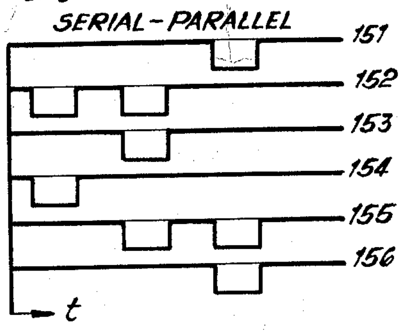

In the second example describing the operational advantages of the switching arrangement of the present invention, the information will be stored in series-series, from right to left, and will be read out in series-parallel from left to right. This may be desirable if the read-out device to be used for reading out the information from the computer is not compatible with the computer. The information to be stored is shown in schematic form in FIGURES 4*a* and 4*b*. Again, six-bit words were utilized; the information to be stored is shown in FIGURE 4*a* having three series-series six-bit words with the following designations: 110001; 010110; and 001010. The series-parallel arrangement shown in FIGURE 4*b* provides the desired result wherein the words are read out in opposite direction from the manner in which they were stored and, accordingly, will read as follows: 010100; 011010; and 100011.

*Writing serial-serial.*—The switching arrangements of FIGURE 1 are operated in the following manner: The register stages 110 and 120 are arranged to transmit information in the reverse direction, i.e., from register stage 30 to register stage 1 of the register 110, and from register stages 54 to 31 of the register 120. The switch 132 is closed and the switch 129 is open. The switch 134 is connected to the output 56. The electronic switches 118 and 123 are placed in the illustrated positions. All of these electronic switches are controlled by a command pulse which sets up the switching arrangement for the particular desired writing arrangement in the storage matrix.

A register input to the terminal 143 is applied by means of the input conductor 60 and the "OR" gate 127 to the register stage 30 of the register 110, and by means of conductor 62 to the register stage 31 of the register 120.

Therefore, stage 30 is placed in the binary "1" position, while stage 54 is placed in the binary "1" position. The respective current drivers 107 for the stage 30 and 121 for the stage 54 are respectively controlled to place the cores connected thereto in a condition to have information stored therein.

At this time, the first bit of the series pulses to be stored is applied to the input terminal 157. The input terminal 157 is connected to all of the "OR" gates 158–163. These, in turn, control their respective switches so as to either apply the bits of information to the respective writing conductors, or do not apply them to the writing conductors if they are open. For the case which has been set up, the core arranged in the bottom row, fifth column of the last group will have the bit of information written therein, since this is the only core which corresponds to the register stages 30 and 54.

The next shift pulse applied to the input 140 will reset the register stage 30 to its binary "0" position and produce an output pulse therefrom which will set the stage 29 into the binary "1" position. The bit of information next applied to the terminal 157 will then be written in the core arranged in the bottom row, fifth column, of the sixth conductor group. It is apparent that this is the only core that corresponds to the binary "1" position of stages 29 and 54.

The storage of the serial-serial information then continues until the stage 1 of register 110 is reset from its binary "1" position to its binary "0" position. At this time, the cores in the bottom row of the storage matrix have had applied thereto and written therein the information in the following manner: The first six-bit word has been applied in the bottom row, fifth column, of each of the column core groups. The second six-bit word has been applied in the fourth column of each of these groups along the bottom row, the third six-bit word has been applied, one bit at a time, to the cores in the third column group, etc.

Accordingly, the output pulse on the conductor 56 from the register stage 1 is applied through the switch 134 to the conductor 57 which operates as a shift pulse for the register stage 54. The register stage 54 is thereby shifted from its binary "1" position to its binary "0" position and emits an output pulse which shifts the stage 53 from the binary "0" position to the binary "1" position. The output pulse from the stage 54 is also applied through the closed switch 132 and the "OR" gate 127 to the input 60 of the register stage 110, thereby resetting the stage 30 from the binary "0" position to the binary "1" position.

The information is then continued to be stored by application to the common input terminal 157 and the stages of the register 110 are continued to be moved from their binary "0" position to the binary "1" position and back by the continuing shifting of pulses applied to the terminal 140. This continues until all of the information has been stored in the core and the shift register stage 31 has been reset from the binary "1" position to the binary "0" position. The open switch 129 prevents the output pulse from the stage 31 from being applied back to the register 110. At the end of this situation, the information has been stored in the storage matrix in the form of bit-serial-word-serial.

*Reading serial-parallel.*—In order to read out the information which has just been stored in serial-serial form, in serial-parallel form in the reverse direction, the register stages 110 and 120 are changed to operate in the ascending manner, namely, from stages 1–30 and stages 31–54, respectively. For this purpose, the switch 134 is operated to the illustrated position wherein it is connected to the output 55 of register 110; the switch 132 is open; and the switch 129 is closed. The electronic switch 118 is closed; the electronic switch 123 is placed in the reading connection wherein it is connected to the conductor 124.

These settings of the electronic switches, as has been mentioned above, are carried out by means of a single command pulse which sets up the switching operation for the illustrated switching circuit.

The operation of the shift registers 110 and 120 is the same as has been described above for the writing serial-parallel arrangement, beginning with Group I of stages 1–6 of the register 110 and the register stage 31 of the register 120. With this operation, the information in the form of simultaneously appearing bits appears across the single outputs of FIGURE 2, namely, terminals 171–176, so that the information is read out in a serial-parallel manner, as described.

It should be mentioned that it is possible, if desired, without changing the switching arrangement, to read out or store the material in a serial-serial manner, as has been set forth under Example No. 1.

*Example 3*

Figure 5A:
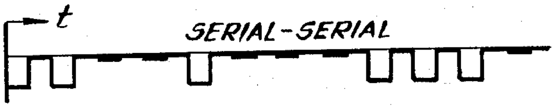
Figure 5B:
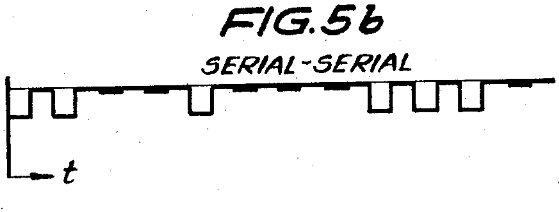

In the third example, the information will be stored in a word-serial-bit-serial manner and read out in a word-serial-bit-serial manner, both in the same direction, as shown in FIGURES 5*a* and 5*b*. This can be useful, for example, if there are two asynchronously running drum storers wherein it is desired first to store the information in serial-serial form in the storage matrix from one of the drum storers, and then to read out the information from the storage matrix according to the present invention into the second drum storer which is running at a different frequency.

This operation is the simplest of the three, and the setup for the writing in serial-serial form is that shown in Example No. 2, and for the reading of serial-serial form is set up such as set forth in Example No. 1. In the last case, it is necessary to apply a register input pulse to the input terminal 143. In both the writing and reading cases, the shift registers are arranged for running in reverse direction so that the switch 129 is open and the switch 132 is closed. Also, the switch 134 is connected to the output 56 of the register 110.

Now that various examples have been described showing how the different kinds of information may be written in the storage matrix by using the switching arrangement incorporating the principles of the present invention, the operations of the stages and their respective current drivers will now be explained with reference to FIGURES 6, 7 and 8.

Referring to FIGURE 6, the connections for the shift register 110 are shown having the shift register stages 1–30, as illustrated in FIGURE 1. Each of the register stages 1–30 is a bistable switching member shown as a divided rectangle. An input pulse applied to the left-hand side of the rectangle of the bistable stages switches the stage from the binary "1" position to the binary "0" position. Two input pulses applied to the right half of the rectangle switch the stage from the binary "0" position to the binary "1" position.

In FIGURE 7, a similar arrangement is shown for the shift register 120.

To carry out the purposes of the previous description, in FIGURE 6, the input conductor 58 for the shift pulses is shown connected to the left-hand portion of the rectangle of the last of the register stages, namely 6, 12, 18, 24 and 30.

The input conductor 59 for the register shift pulse and the clearing pulse is applied to each of the first five stages of each of the register groups so that, for example, it is connected to register stages 1–5 of the first group.

It is, therefore, seen that the shift pulse applied to the input terminal 140 is applied on the input conductor 58 to one of the stages of each of the register groups. The clearing pulse applied to the input terminal 142, on the other hand, is applied only to the first five register stages of each register group.

The input conductor 60 for the register input pulses is connected to the register stages 1–6 of the first group and to the right-hand portion of the register stage 30 in the last group. The output conductor 55 is connected to the output of the last stage 30, while the output conductor 56 is connected to the output of the first stage 1.

While the information is to be transmitted through the register 110 in the direction from stages 1–30 and so as to operate the register stages by register groups, the outputs of the last stage of each group, namely, stages 6, 12, 18 and 24, are respectively connected to all of the stages of the next succeeding group. For example, the output from stage 6 is connected through conductor 181 to the right-hand portion of all of the stages 7–12 of the second group.

In order to be able to transmit the information through the register 110 in the reverse direction from stage 30 to stage 1, the output of each of the stages 2–30 is connected to the input of the previous stage. It can be seen, for example, that the output of stage 7 is connected on conductor 182 to the binary "1" positioning portion of the register stage 6.

In FIGURE 7, the connections of the shift register 120 having register stages 31–54 are shown. The bistable register stages are illustrated in the same form as in FIGURE 6. The input 62 for the register input pulse is connected to the binary "1" positioning side of the first register stage 31 and the last register stage 54. To the input conductor 57 used for the register input pulses, the binary "0" positioning portions of the stages 31–54 are connected. The stages 32–53 have their respective outputs interconnected to permit transmitting information through the register in either forward or reverse direction. It can be seen, for example, that the output of the register stage 34 is connected on conductor 183 to the binary "1" positioning portion of the stage 35, while the output of stage 35 is connected on conductor 184 to the binary "1" positioning portion of the register stage 34.

Referring now to FIGURE 8, an electrical schematic view is shown of an example of the register stages being used together with the current drivers therefor. Three register stages are illustrated, and these numbered stages can be added either from the left or from the right, as it can be seen that these stages are identical. The flip-flop portions are indicated by dashed outlines with the reference characters $n$, $n+1$ and $n+2$. These register stages are transistor flip-flop circuits having two transistors $T_1$ and $T_2$.

A register stage can be in the binary "0" position, for example, if the transistor $T_1$ is in conducting condition and the transistor $T_2$ is in non-conducting condition. Similarly, the register stage can be in the binary "1" position, if the transistor $T_1$ is not conducting and the transistor $T_2$ is conducting.

The shift pulses are applied on the conductor 77 to the base of the transistor $T_1$ of each register stage. The pulses for placing the register stage in the binary "1" position are applied to the base of the transistor $T_2$ by means of an "OR" gate which can be one of the three diodes $D_1$, $D_2$ or $D_3$. In order to position the proper operation of the "OR" gate, the cathodes of the diodes $D_1$, $D_2$ and $D_3$ are respectively connected by means of transistor switches 186, 187 and 188 to a source of voltage 189. The magnitude of the voltage source 189 is so chosen that the diodes which are connected thereto, due to the proper operation of the respective switches, are biased so that no input pulse can be transmitted through the diodes to the base of the transistor $T_2$.

By means of such a control apparatus, all of the different driving conditions of the switching circuit can be obtained. For example, in order to have the stage transmit information from the register stage $n$ via register stage $n+1$ to the register stage $n+2$ (in the forward direction), the switches 187 and 188 are closed so that diodes $D_2$ and $D_3$ are blocked. It is now possible to utilize the output pulse from the previous register stage as an input pulse for one of the register stages.

In order to have the information transmitted in the reverse direction from register stage $n+2$ via register stage $n+1$ to register stage $n$, for example, it is merely necessary to close switches 186 and 187 to block the diodes $D_1$ and $D_2$. In this position, the input pulse for switching the register stage from the binary "0" to the binary "1" position is the output pulse obtained from the next following register stage.

In order to switch the register stages in groups, the switches 186 and 188 are closed so as to block diodes $D_1$ and $D_3$. The stages can now be switched by groups by the application of pulses to the conductor 78. In order to clear all of the register stages, switches 186, 187 and 188 all are closed, so as to block all of the diodes $D_1$, $D_2$ and $D_3$. The clearing pulse is then applied over the conductor 77 to clear the register stages. The output pulses from each of the register stages cannot be applied to any of the succeeding or preceding stages, due to the blocking by the diodes $D_1$, $D_2$ and $D_3$.

Similar additional arrangements may be provided by using different combinations of the switches 186, 187 and 188 and the corresponding blocking conditions of the diodes $D_1$, $D_2$ and $D_3$.

For example, to achieve the register stages 31 to 54, as shown in FIGURE 7, it is merely necessary to use diodes $D_1$ and $D_3$ and the corresponding switches 186 and 188. Diode $D_2$ and switch 187 are not necessary. Of course, the first register stage 31 and the last register stage 54 would be free to permit the shifting of pulses to be applied thereto.

In FIGURE 8, there is also shown the switching arrangement for the current drivers.

The operating resistance for the transistor $T_2$ of the register stage is divided into two partial resistors $R_1$ and $R_2$. The partial resistor $R_2$ is connected in parallel with the base-emitter circuit of the transistor current driver, so that it controls directly the collector current of the transistor $T_2$.

The writing conductors 101 and the reading conductors 102 are arranged in the collector circuit of the transistor current driver. The coupling of the reading or the writing conductors is accomplished by the diodes $D_4$ and $D_5$. Therefore, it can be seen that with the arrangement of the circuits shown in FIGURES 6, 7 and 8, all of the desired switching arrangements set forth for the different types of operating examples can easily be carried out.

The operation of the circuit shown in FIGURE 8 is more fully described in the copending application, Serial No. 35,174, filed June 10, 1960, of Hans-Joachim Kunzke, entitled "Reversible Electronic Sequence Switching Network," now Patent No. 3,067,341, dated December 4, 1962.

It is apparent that the above described switching circuit arrangements have substantial flexibility for use with different types of computers and read-out devices. Simple programming and control devices can be utilized for accomplishing the desired results.

It will be understood that the above description of the present invention is suspectible to various modifications, changes and adaptations and the same are intended to be comprehended within the meaning and range of equivalents of the appended claims.

I claim:

1. In a switching apparatus for a storage matrix in which bits of information are stored along at least two different geometrical dimensions, in combination, first shift register means connected to portions of the storage matrix along a first geometrical direction; and at least a second shift register means connected to said portions of the storage matrix along a different geometrical direction, each of said shift register means being a bidirectional shift register capable of reversing the direction of movement of information therethrough independently of the direction of movement of information through the other shift register; the outputs from the first and the last of the stages of said first shift register means being connected to the input of said second shift register means for providing the shift pulse for initiating operation of said second shift register means.

2. In a switching apparatus for a storage matrix in which bits of information are stored along at least two different geometrical dimensions, in combination, first shift register means connected to portions of the storage matrix along a first geometrical direction; and at least a second shift register means connected to said portions of the storage matrix along a different geometrical direction, each of said shift register means being a bidirectional shift register capable of reversing the direction of movement of information therethrough independently of the direction of movement of information through the other shift register; the outputs of all of the stages of said second shift register means being connected to the register pulse input of said first register means by means of an "OR" gate.

3. In a switching apparatus for a storage matrix in which words made up of bits of information are stored along at least two different geometrical dimensions, in combination, first shift register means divided into register groups, each of said register groups in turn being divided into a plurality of register group stages, the number of stages in each register group being equal to the number of bits of information in each word to be stored in the matrix; a plurality of writing conductors connected at one of their respective ends to portions of the matrix arranged along a first geometrical direction, the other ends of said conductors being respectively connected to one of said register group stages, said conductors being arranged in conductor groups equal to the number of bits of information in each word to be stored in the matrix, the number of conductors in each conductor group being equal to the number of said register groups, each of said register groups thereby having a stage connected to each of said conductor groups; said writing conductor groups being connected to a source of driving voltage via a plurality of switches which are arranged so that each of said switches is located between said voltage source and one of said writing conductor groups, respectively, whereby writing current for said respective portions of said matrix will flow only after the switch corresponding to said respective writing conductor group is operated; and a plurality of reading conductors, each of said reading conductors being respectively connected at one of its ends to one of said portions of the matrix, and at the other of its ends to the same register stage as the writing conductor connected to said portion.

4. Apparatus as claimed in claim 3 wherein a transistor switch is connected between said voltage source and said plurality of reading conductors so that reading current flows for said respective portions of said matrix only after said switch is operated.

5. In a switching apparatus for a storage matrix in which words made up of bits of information are stored along at least two different geometrical dimensions, in combination, first shift register means divided into register groups, each of said register groups in turn being divided into a plurality of register group stages, the number of stages in each register group being equal to the number of bits of information in each word to be stored in the matrix, said first register means having a shift pulse input which is connected directly to the input of the last stage of each of said first register groups and which shift pulse is further connected by means of an "OR" gate to the inputs of the remaining stages of said first shift register group; a plurality of writing conductors connected at one of their respective ends to portions of the matrix arranged along a first geometrical direction, the other ends of said conductors being respectively connected to one of said register group stages, said conductors being arranged in conductor groups equal to the number of bits of information in each word to be stored in the matrix, the number of conductors in each conductor group being equal to the number of said register groups, each of said register groups thereby having a stage connected to each of said conductor groups; and a plurality of reading conductors, each of said reading conductors being respectively connected at one of its ends to one of said portions of the matrix, and at the other of its ends to the same register stage as the writing conductor connected to said portion.

6. In a switching apparatus for a storage matrix in which words made up of bits of information are stored along at least two different geometrical dimensions, in combination, first shift register means divided into register groups, each of said register groups in turn being divided into a plurality of register group stages, the number of stages in each register group being equal to the number of bits of information in each word to be stored in the matrix, said first shift register means having a clearing pulse input which is connected by means of an "OR" gate to the outputs of each of the stages of said shift register means except for the last of said stages in each of said register groups; a plurality of writing conductors connected at one of their respective ends to portions of the matrix arranged along a first geometrical direction, the other ends of said conductors being respectively connected to one of said register group stages, said conductors being arranged in conductor groups equal to the number of bits of information in each word to be stored in the matrix, the number of conductors in each conductor group being equal to the number of said register groups, each of said register groups thereby having a stage connected to each of said conductor groups; and a plurality of reading conductors, each of said reading conductors being respectively connected at one of its ends to one of said portions of the matrix, and at the other of its ends to the same register stage as the writing conductor connected to said portion.

7. In a switching apparatus for a storage matrix in which words made up of bits of information are stored along at least two different geometrical dimensions, in combination, first shift register means divided into register groups, each of said register groups in turn being divided into a plurality of register group stages, the number of stages in each register group being equal to the number of bits of information in each word to be stored in the matrix; a plurality of writing conductors connected at one of their respective ends to portions of the matrix arranged along a first geometrical direction, the other ends of said conductors being respectively connected to one of said register group stages, said conductors being arranged in conductor groups equal to the number of bits of information in each word to be stored in the matrix, the number of conductors in each conductor group being equal to the number of said register groups, each of said register groups thereby having a stage connected to each of said conductor groups; a plurality of reading conductors, each of said reading conductors being respectively connected at one of its ends to one of said portions of the matrix, and at the other of its ends to the same register stage at the writing conductor connected to said portion; and a source of voltage is connected by means of respective "OR" gates and pulse-controlled switches to the binary "1" positions of the stages of each of said shift registers for initiating the writing of the bits of information in the storage matrix.

8. In a switching apparatus for a storage matrix in which words made up of bits of information are stored along at least two different geometrical dimensions, in combination, first shift register means divided into register groups, each of said register groups in turn being divided into a plurality of register group stages, the number of stages in each register group being equal to the number of bits of information in each word to be stored in the matrix; a plurality of writing conductors connected at one of their respective ends to portions of the matrix arranged along a first geometrical direction, the other ends of said conductors being respectively connected to one of said register group stages, said conductors being arranged in conductor groups equal to the number of bits of information in each word to be stored in the matrix, the number of conductors in each conductor group being equal to the number of said register groups, each of said register groups thereby having a stage connected to each of said conductor groups; a plurality of reading conductors, each of said reading conductors being respectively connected at one of its ends to one of said portions of the matrix, and at the other of its ends to the same register stage as the writing conductor connected to said portion; each of said portions of said matrix connected to said same conductor group being further connected to a sensing conductor to provide a plurality of sensing conductors, each of said sensing conductors being connected together at one of its respective ends, the other of its respective ends being connected to a common output by means of an "OR" gate.

9. Apparatus as claimed in claim 1 wherein the input for the register pulse is connected to the binary "1" position of the first and last stages of said second shift register and by means of an "OR" gate to the binary "1" position of each of said stages of said first register group and to the last stage of said first register group.

References Cited in the file of this patent

UNITED STATES PATENTS

| | | |
|---|---|---|
| 2,842,682 | Clapper | July 8, 1958 |
| 2,843,320 | Chisholm | July 15, 1958 |
| 2,877,357 | Pearsall et al. | Mar. 10, 1959 |
| 2,881,333 | Pickard | Apr. 7, 1959 |
| 2,895,124 | Harris | July 14, 1959 |
| 2,899,572 | Skelton et al. | Aug. 11, 1959 |
| 2,911,621 | Crooks | Nov. 3, 1959 |
| 2,931,022 | Triest | Mar. 29, 1960 |
| 2,983,828 | Samuel | May 9, 1961 |